United States Patent [19]

Hodgins et al.

[11] 4,278,086
[45] Jul. 14, 1981

[54] VARIABLE STOP SYRINGE

[75] Inventors: Bruce J. Hodgins, Hialeah; Ivan K. Saltz, Cooper City; Guenter Ginsberg, Miami, all of Fla.

[73] Assignee: Coulter Electronics, Inc., Hialeah, Fla.

[21] Appl. No.: 115,624

[22] Filed: Jan. 28, 1980

[51] Int. Cl.³ .............................................. A61M 3/00
[52] U.S. Cl. ................................ 128/224; 128/218 A; 128/213 R
[58] Field of Search ............... 128/215, 218 R, 218 A, 128/214 R, 214 E, 214 F, 224, DIG. 1, DIG. 12, 213; 222/129, 132, 136, 137, 145

[56] References Cited

U.S. PATENT DOCUMENTS

| 2,786,468 | 3/1957 | Singer et al. | 128/218 A |
| 3,949,746 | 4/1976 | Wallach | 128/218 A X |
| 4,196,730 | 4/1980 | Wilson | 128/214 R |
| 4,207,889 | 6/1980 | Oloff et al. | 128/213 R |

Primary Examiner—John D. Yasko
Attorney, Agent, or Firm—Silverman, Cass & Singer, Ltd.

[57] ABSTRACT

A variable stop syringe for automatically selecting, aspirating and dispensing one of a desired plurality of fluid volumes. The variable syringe includes a plurality of stops in an array each of which defines a particular fluid volume. The array selectively is moved to position the desired stop in the fully aspirated position of the syringe plunger. The stop positions are coded and automatically may be read to select the desired syringe stop for the particular volume of fluid desired to be aspirated and dispensed. The completely dispensed and the fully aspirated positions of the plunger, as well as the speed of the plunger operation, may be monitored to ensure that the plunger is operating properly.

19 Claims, 6 Drawing Figures

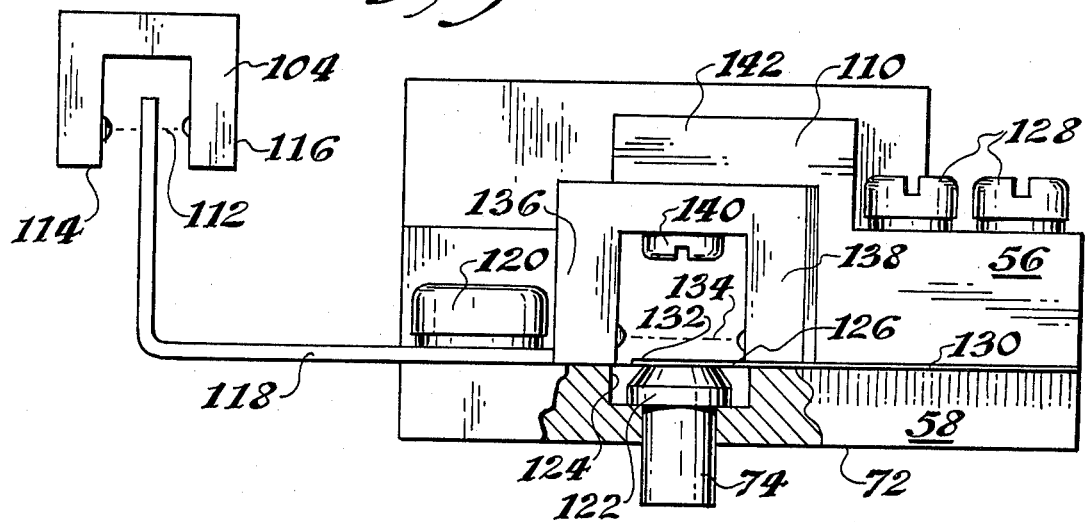
Fig 6
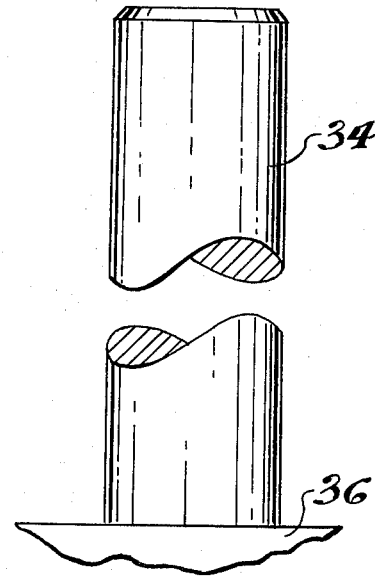

VARIABLE STOP SYRINGE

CROSS REFERENCE TO RELATED APPLICATIONS

This invention is related to the subject matter disclosed in the following copending and commonly assigned applications which are incorporated herein by reference:

Apparatus For Monitoring Chemical Reactions and Employing Moving Photometer Means, G. Ginsberg et al, Ser. No. 846,337, filed Oct. 28, 1977, now U.S. Pat. No. 4,234,538.

Sample and Stat Feeding System and Sample Tray, G. Ginsberg et al, Ser. No. 115,924, filed Jan. 28, 1980.

Cuvette Washing Apparatus, B. Hodgins, Ser. No. 115,692 filed Jan. 28, 1980.

System and Program for Chemical Reaction Observation with a Moving Photometer, G. Ginsberg et al, Ser. No. 115,734 filed Jan. 28, 1980, filed concurrently herewith.

Fluid Transfer Mechanism, V. Drbal et al, Ser. No. 115,691 filed Jan. 28, 1980 filed concurrently herewith.

Probe Washer, B. Hodgins, Ser. No. 115,625 filed Jan. 28, 1980 filed concurrently herewith.

BACKGROUND OF THE INVENTION

The invention relates to a system and method for supplying a plurality of precise fluid volumes from a single syringe unit and more particularly this invention concerns the supplying of precise volumes of fluid by automatically selecting the desired plunger stop for each operation of the syringe device.

In many types of chemical analyzing systems it is desirable to provide a number of different fluid volumes in the system each of which precisely must be obtained. For example, in analyzing body fluids, sample volumes or aliquots are picked up and dispensed into reaction vessels in very precise volumetric amounts, generally with a precise amount of diluent. The tests in such a system may be monitored by measuring the chemical reaction resulting from the addition of one or more reagents to the sample and diluent volume.

For each of the tests selected for the body fluid of a particular patient, the amount of sample, diluent and reagent to be added for the test differ but each are alike from the point of view that the amounts selected must be extremely precise. For example, in one system in which the sample fluids and reagent fluids are picked up or aspirated by probes, the required test volumes using two different reagent probes and a single sample probe range from 2 to 500 microliters in increments of 2, 4, 6, 8, 10, 20, 40, 50, 60, 80, 100, 200, 400 and 500 microliters. It is apparent that it would be extremely desirable that each of the syringe units utilized in such a system have a wide range of flexibility as well as the capability of automatically selecting any one of the volumes to which it may be assigned to aspirate and dispense.

Further, since the sequence of testing in such a chemical analyzer will vary depending upon the number of tests to be conducted on the sample from each patient, as well as the number and type of tests the analyzer can perform, the syringe should be flexible so that any of the desired volumes may be selected during operation of the syringe. Further, since the results of the tests are related to the health of a particular patient it is extremely critical that the volumes selected accurately be obtained so that the test reaction correctly may be monitored.

SUMMARY OF THE INVENTION

The above and other disadvantages of prior art aspirating and dispensing systems and techniques are overcome in accordance with the present invention by providing a variable stop syringe having a plurality by syringe plunger stops which automatically may be selected for each operation of the syringe to provide the proper fluid volume desired. The syringe plunger stops may be mounted into an array which are individually coded and may be moved into the aspirating position by reading the coding of the desired plunger stop.

BRIEF DESCRIPTION OF THE DRAWINGS

FIG. 6 is an operational side plan view partially broken away of a second embodiment of syringe plunger sensing mechanism.

DESCRIPTION OF THE PREFERRED EMBODIMENTS

Figure 1:
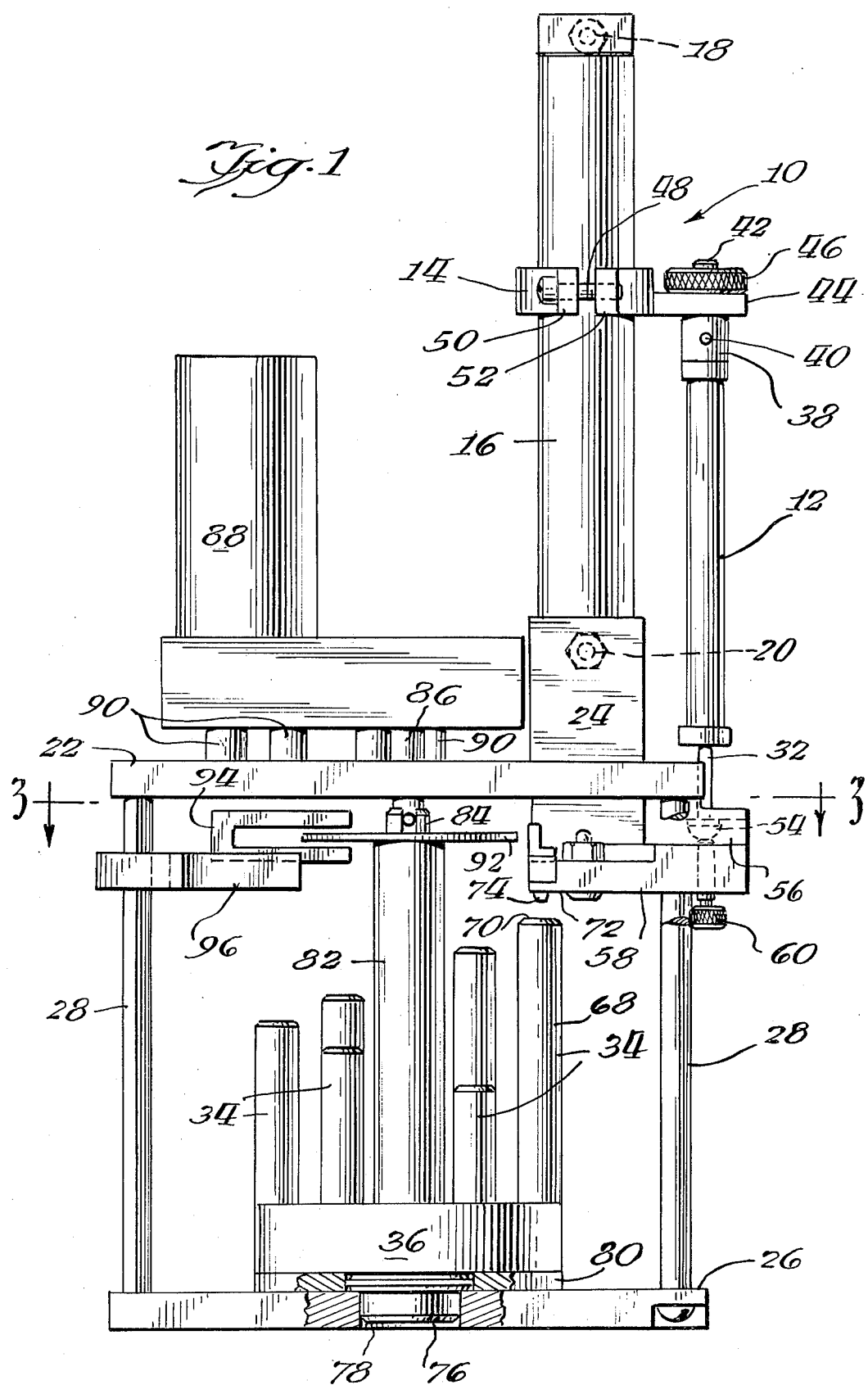
FIG. 1 is a front plan view of the variable stop syringe of the invention.
Figure 2:
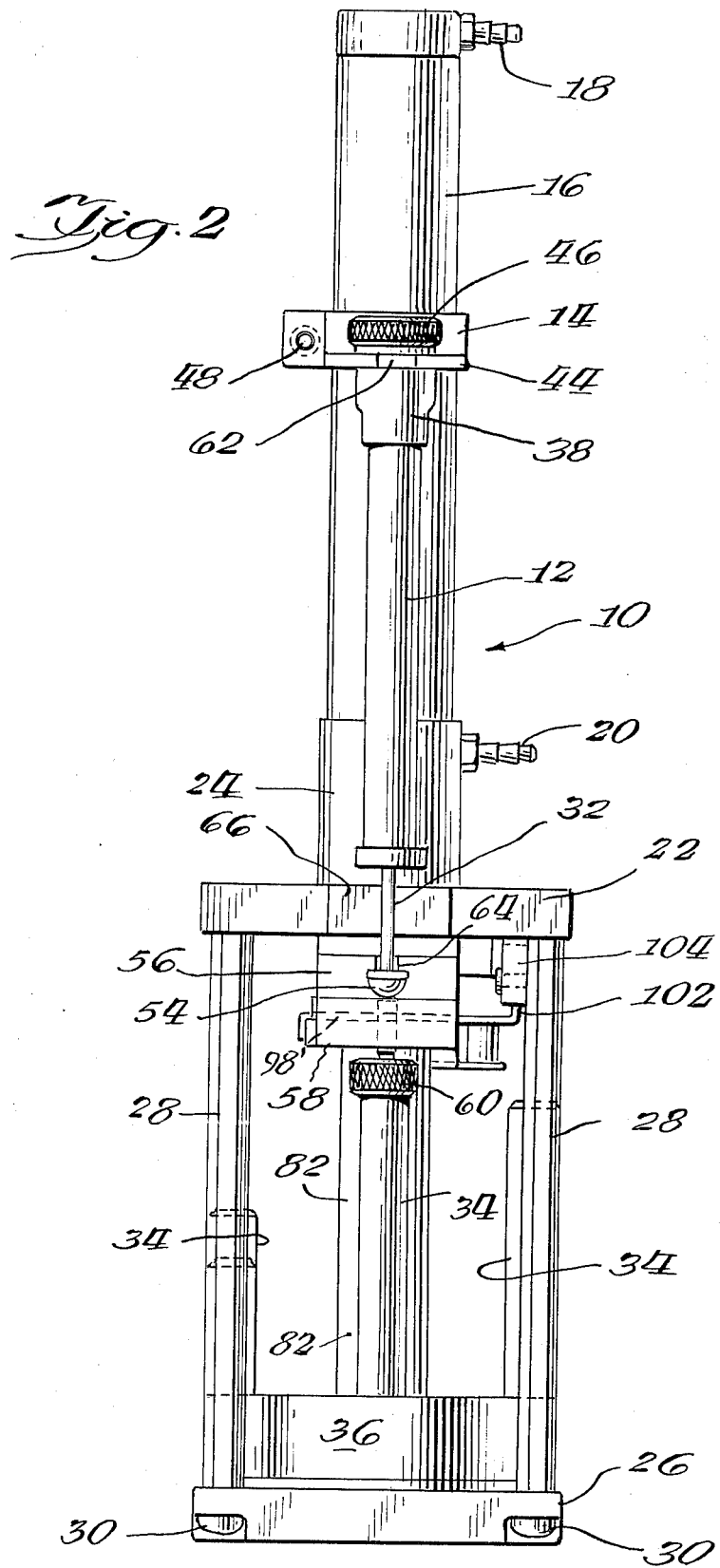
FIG. 2 is a side plan view of the syringe.

Referring now to FIGS. 1 and 2, a syringe apparatus constructed in accordance with the invention is designated generally by the reference character 10. The variable syringe 10 includes a conventional syringe having a cylinder body 12 which is mounted by a bracket 14 to a drive cylinder 16. The drive cylinder 16 may be pneumatic or hydraulic and is driven between its upper and lower positions by fluid pressure applied to an upper fitting 18 and a lower fitting 20 which are coupled to conventional fluid lines and valving (not shown). The drive cylinder 16 is mounted to an upper baseplate 22 of the syringe 10 by a mounting block 24.

The upper baseplate 22 is mounted to a main baseplate 26 of the syringe 10 by a plurality of rods or posts 28. The rods 28 may be screwed or otherwise secured into the upper baseplate 22 and then secured by screws 30 into the lower baseplate 26. The drive cylinder 16 drives a syringe plunger or piston 32 between an upper or fully dispensed position and a lower or fully aspirated position defined by one of a plurality of plunger stops 34. The plunger stops are mounted in a carousel 36. The plunger stops 34 preferably removably are mounted in an annular array on the carousel 36 which may be rotated to select the desired plunger stop to aspirate and dispense the selected volume of fluid.

The syringe body 12 includes an upper fitting 38 which includes one or more ports 40 (only one of which is shown in FIG. 1) which are coupled to a fluid supply, dispensing lines and valving (not shown). One port may be utilized in the aspirating stroke and the second port in the dispensing stroke or the two ports may be coupled to different fluid sources through conventional valving. For instance, the syringe 10 may be operated to aspirate an amount of fluid from a fluid supply in the downward stroke of the piston 32 which may be held in a fluid probe or other aspirating and dispensing device. Another vessel may be moved to the probe or the probe itself may be moved to the vessel and the aspirated fluid volume then may be dispensed therein on the dispensing stroke. Further, in a system where the fluids are picked up, such as sample fluids on one aspirate and dispense cycle, the next aspirate and dispense cycle may draw diluent or other cleaning fluid into the second port to dispense it through the probe to add diluent to the sample and/or clean the inside of the probe prior to picking up the next sample.

The syringe body 12 also includes a threaded end 42 which extends through a plate 44 of the clamp 14. The threaded end 42 and hence the syringe body 12 is secured to the plate 44 of the clamp 14 by a nut 46 threadedly engaged on the end 42 and secured against the top of the plate 44.

The clamp or bracket 14 is adjustably secured to the drive cylinder 16 by a screw 48 engaged between clamp portions 50 and 52 of the bracket 14. The syringe plunger 32 includes a handle head 54 which is secured in a retainer 56. The retainer 56 is mounted on a cylinder drive block 58. The piston of the drive cylinder 16 is secured to the cylinder drive block 58 in a conventional manner to drive the block 58 from its upper fully dispensed position shown in FIG. 1, to its lower fully aspirated position defined by the top of the plunger stop 34.

Figure 3:
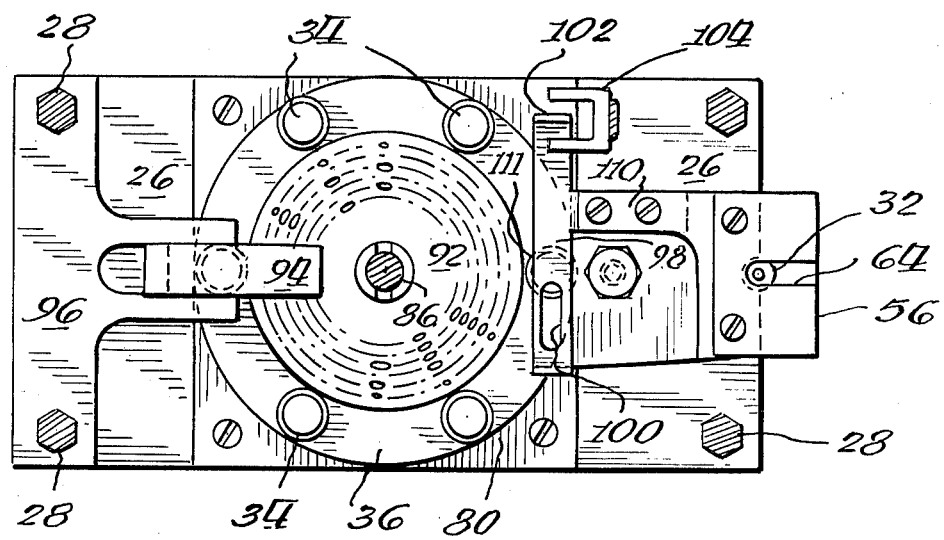
FIG. 3 is a top plan view taken along the line 3—3 of FIG. 1.

The head 54 is secured into the retainer 56 by a thumbscrew 60 which is threadedly engaged through the drive block 58 to bear against and retain the head 54. The syringe body 12 and piston may be removed from the syringe 10 by loosening the thumbscrew 60 and the nut 46, following which the upper portion of the cylinder body 12 may be removed through a slot 62 in the plate 44 and the piston rod 32 and head 54 may be removed through a slot 64 in the retainer 56. The piston or piston rod 32 freely extends through a slot 66 in the upper plate 22 when the syringe body 12 is mounted in the variable syringe 10. The retainer 56 and drive block 58 are illustrated in FIG. 1 with the posts 28 removed on one side to best illustrate the structure; however, typically there would be at least 4 posts secured between the corners of the plates 22 and 26 (FIG. 3).

Referring now to FIG. 1, the selected plunger stop 34 in the aspirating position is a stop 68 having an upper end 70 against which a bottom portion 72 of the drive block 58 is driven to aspirate the precise selected fluid volume in the cylinder body 12. The distance between the bottom 72 and the top 70 of the stop 68 precisely defines the exact travel of the drive block 58 and hence of the piston 32 of the syringe body 12. Thus, the amount of fluid aspirated and dispensed is precisely defined by the top of the stop in the fully aspirated position. The stop 68 being the longest of the stops 34 illustrated in FIG. 1, defines the smallest volume which may be selected to be aspirated by the variable syringe 10. The stops 34 each will have a different height or length and will be selected depending upon the precise fluid volumes desired to be aspirated by the particular variable syringe 10. There may be any convenient number of stops 34 on the carousel 36 and as previously mentioned, each of the stops may be removed and replaced by other stops depending upon the volume desired to be aspirated and the dimensions of the cylinder body 12.

The drive block 58 includes an actuation button 74 reciprocally mounted therein and biased through the bottom 72 of the block 58. The button 74 is aligned with the stop in the fully aspirated position and is used as a portion of the sensing mechanism for sensing when the fully aspirated position has been reached, i.e., with the bottom surface 72 against the top of the selected stop in the fully aspirated position. The operation of the actuation button 74 will be further described with respect to FIGS. 4 through 6.

The stop 34 selected for the fully aspirated position (stop 68 in FIG. 1) may be manually or automatically selected by the analyzing device in which the variable stop syringe 10 is utilized or by the syringe 10 itself. The carousel 36 includes a main bearing 76 mounted in an aperture 78 in the baseplate 26. The carousel 36 is mounted on a thrust bearing or bearing plate 80 which then is mounted to the baseplate 26. The carousel 36 includes an upstanding drive shaft 82 which includes a smaller dimension upper end 84 which may be pinned or secured to a motor drive shaft 86 of a drive motor 88. The motor 88 may be any conventional type of motor which will rotate the drive shaft 86 with the desired precision, which will rotate the carousel 36 to position the correct stop 34 in the fully aspirated position of the drive block 58. The motor 88 is mounted to the upper plate 22 by a plurality of rods or pins 90, but of course could be mounted directly to the baseplate 22 if desired. Further, the mounting of the motor 88 is not critical and it could be mounted through other conventional gearing to drive the carousel 36 from the same plane as the carousel 36 or it could be mounted to the bottom of the baseplate 26.

The angular orientation of the carousel 36 and hence the position of the various stops 34 on the carousel 36 may be defined by a code wheel 92 secured to the drive shaft 82 at the upper end 84. The code wheel 92 rotates with the drive shafts 82 and 86 and the angular position of the code wheel and hence the position of the stops 34 may be sensed by a conventional optical reader 94 which is mounted to one or more of the posts 28 by a mounting bracket 96. The mounting bracket 96 could be eliminated and the optical reader 94 could be directly mounted to the plate 22. The operation of the code wheel 92 and reader 94 is best illustrated in the top view of FIG. 3.

The bracket 96 extends between a pair of the mounting rods 28 with the code wheel 92 rotating on the shaft 86 and being read by the reader 94. The variable syringe 10 also may sense the location of the cylinder drive block 58 and hence the plunger 32 position in the fully dispensed position against or adjacent the plate 22 and in the fully aspirated position against the top of the selected stop 34.

Figure 4:
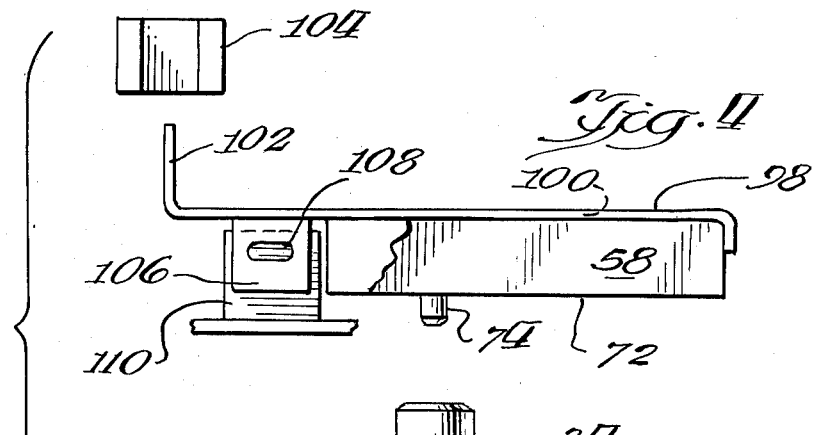
FIG. 4 is an operational side plan view of one embodiment of syringe plunger sensing mechanism.
Figure 5:
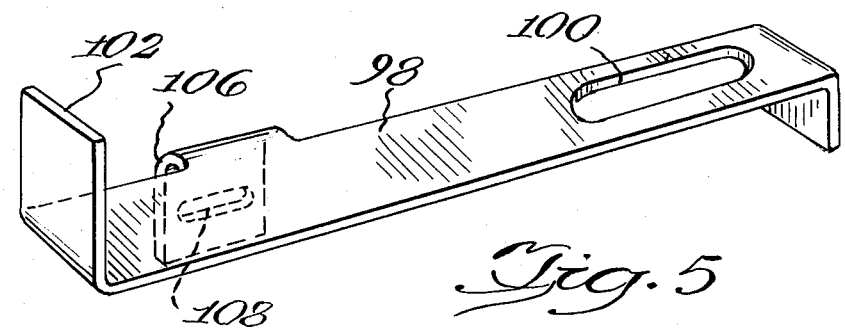
FIG. 5 is a perspective view of the activation mechanism of the sensing mechanism of FIG. 4.

One embodiment of position sensing mechanism is shown in FIGS. 3 through 5. This embodiment includes an actuation spring 98 which is mounted on the drive block 58 and travels therewith. The spring 98 includes a slot 100 through which a screw or other securing device may be inserted to secure the spring to the block 58. The spring 98 extends over the top of the button 74 to bias the button 74 through the bottom 72 of the block 58 as shown in FIG. 4. The spring includes an upperwardly extending tab 102 which activates an optical light switch 104 which may be mounted to the plate 22. When activated by the tab 102 the switch 104 indicates that the block 58 and hence the syringe plunger 32 is in the fully dispensed position.

The spring 98 includes a second tab 106 which includes a slot or aperture 108 therethrough. The tab 106 activates a down or fully aspirated optical switch 110 which also is mounted on the block 58 and is activated when its light path through the slot 108 is interrupted by the tab 106 being moved to move the slot 108 and block the light path. The light path of the switch 110 through the slot 108 is interrupted as the block 58 is driven downwardly against the top of the stop 34. The actuation button 74 will be driven upwardly by the stop 34 until it is flush with the bottom 72 and the bottom 72 is flush against the top of the stop 34. The opposite end of the button 74 will push the spring 98 upward and hence the tab 106 upward blocking the light path of the switch 110 to indicate that the block 58 and hence the syringe plunger 32 is in the fully aspirated position.

Thus, both the positioning of the proper stop 34 in the fully aspirated position 111 (FIG. 3), as well as the proper operation of the syringe between the fully dispensed and fully aspirated positions usually is assured. It also may be desirable to time the elapsed time between the activation of the light switch 104 as the block 58 is driven downwardly to the top of the stop 34 to actuate the switch 110 and vice versa to obtain an elapsed time reading which is indicative of the operation of the cylinder 16 and the syringe plunger 32. Further, an optical reader could be utilized with a code bar (not shown) which would give an actual indication of the operating speed of the block and plunger operation and not just the elapsed time between the upper and lower positions. This could be important, since the proper operation of the plunger 32 and the drive cylinder will aspirate and dispense a precise amount of the fluid as previously described, but operation of the cylinder in a non-smooth or jerky operation may aspirate or dispense an imprecise amount of fluid. Therefore, it may be desirable to monitor both the elapsed time between the fully aspirated and fully dispensed positions as well as the speed of the plunger.

Referring to FIG. 6, a second embodiment of plunger sensing mechanism is illustrated. The embodiment of FIG. 6 is not drawn to any particular scale, but operates substantially identically with the embodiment shown in FIGS. 3 to 5. The light switch 104 is oriented slightly differently in FIG. 6, but still has a light path 112 extending between arms 114 and 116 of the switch 104. The light path 112 is interrupted by an L-shaped tab or arm 118 mounted on the block 58 by a screw 120. The block 58 is shown in the fully dispensed position in FIG. 6, with the arm 118 interrupting the light path 112 of the switch 104. In this position, the actuation button 74 extends through the bottom of the block 58 and may include a head 122 which is biased into an annular recess or shoulder 124 in the block 58 by a bias spring 126. The spring 126 may be mounted and secured underneath the retainer 56 by screws 128. The spring 126 may be a C-shaped spring having a first end 130 secured under the retainer 56 and a free end 132 extending over and biasing the head 122 of the button 74. The switch 110 includes a light path 134 extending between arms 136 and 138 which is interrupted by the button 74 and spring 132 when the button 74 is driven against the top of the stop 34 in the fully aspirated position. The switch 110 may be mounted by a screw 140 to an extension 142 of the retainer 56.

Many modifications and variations of the present invention are possible in light of the above techniques. The sensing mechanisms for the fully aspirated and fully dispensed positions may be altered to produce the same effect without changing the operation of the device. The mounting, size and number of the various elements also may be changed without effecting the operation of the syringe 10. In an analyzer which picks up a sample volume, dispenses it into a reaction vessel with a measured volume of diluent, then picks up and dispenses therewith a reagent, there would be three of the variable stop syringes 10 with the stops 34 selected to provide the proper aspiration volumes. One or more syringes 10 in combination with an analyzer utilizing a variety of tests and reagents and probes to pick up and dispense the sample and reagents, functions to eliminate a large number of fluid lines, pumps, valves, etc. It is, therefore, to be understood that within the scope of the appended claims, the invention may be practiced otherwise then as specifically described.

What is claimed and desired to be secured by Letters Patent of the United States is:

1. A method of aspirating and dispensing one of a plurality of predetermined fluid volumes from a fluid supply comprising:
   selecting one of the fluid volumes; moving a plunger stop corresponding to said selected fluid volume into a fully aspirated position;
   driving a syringe plunger coupled to the fluid supply from a rest or fully dispensed position to the fully aspirated position defined by said plunger stop to aspirate said selected fluid volume; and
   driving said plunger from the fully aspirated position to said fully dispensed position to dispense said selected fluid volume.

2. A method as claimed in claim 1 including:
   mounting a plurality of plunger stops in an array, with one stop corresponding to each predetermined fluid volume; and
   rotating said array to align the plunger stop corresponding to the selected fluid volume in said fully aspirated position.

3. A method as claimed in claim 2 including:
   coding each of said plunger stop positions with an individual code; and
   reading said coding as said array is rotated to select the correct plunger stop.

4. A method as claimed in claim 1 including:
   sensing when said plunger is in said fully dispensed and said fully aspirated positions to ensure that said plunger has aspirated and dispensed the selected fluid volume.

5. A method as claimed in claim 4 including:
   timing the elapsed time between sensing the plunger in one position and sensing the plunger in the opposite position to ensure said plunger is operating properly.

6. A method as claimed in claim 1 including:
   sensing the speed of said plunger as it is driven between said positions to ensure said plunger is operating properly.

7. An apparatus adapted to selectively aspirate and dispense one of a plurality of predetermined fluid volumes when coupled to a fluid supply comprising:
   means for selecting one of the fluid volumes;
   plunger stop means;
   means for moving said plunger stop means into a fully aspirated position corresponding to said selected fluid volume;
   syringe plunger means;
   means for driving said syringe plunger means from a rest or fully dispensed position to a fully aspirated position defined by said plunger stop means; and means for driving said syringe plunger means from the fully aspirated position to said fully dispensed position.

8. An apparatus as claimed in claim 7 including:
means for sensing the speed of said plunger means as it is driven between said positions to ensure said plunger means are operating properly.

9. An apparatus as claimed in claim 7 including:
means for sensing when said plunger means are in said fully dispensed position; and
means for sensing when said plunger means are in said fully aspirated position to ensure that said plunger means have reached each position.

10. An apparatus as claimed in claim 9 including:
means for timing the elapsed time between sensing said plunger means in one position and sensing said plunger means in the opposite position to ensure said plunger means are operating properly.

11. An apparatus as claimed in claim 9 including:
said aspirated position sensing means include actuation means carried by said syringe plunger means actuated by contact with said plunger stop means for indicating when said plunger means are in said fully aspirated position; and
said dispensed position sensing means include actuation means actuated by said syringe plunger means reaching said dispensed position.

12. An apparatus as claimed in claim 11 including:
said aspirated position actuation means include a reciprocable button and a switch which is actuated by said button being displaced by contact with said plunger stop means; and
said dispensed position actuation means include a switch which is actuated by tab means carried by said plunger means.

13. An apparatus as claimed in claim 7 including:
said plunger stop means include a plurality of plunger stops mounted in an annular array, with one stop corresponding to each predetermined fluid volume; and
said moving means include means for rotating said array to align the plunger stop corresponding to the selected fluid volume in said fully aspirated position.

14. An apparatus as claimed in claim 13 including:
said plunger stops are removably mounted in an annular array on a carousel.

15. An apparatus as claimed in claim 13 including:
individual code means coding each of said plunger stop positions; and
means for reading said coding as said array is rotated to select the correct plunger stop.

16. An apparatus as claimed in claim 15 including:
said code means include a code disc fixedly mounted for rotation with said array; and
said reading means include a non-rotating optical reader which reads the angular position of said code disc.

17. An apparatus as claimed in claim 15 including:
means for sensing when said plunger means are in said fully dispensed position; and
means for sensing when said plunger means are in said fully aspirated position to ensure that said plunger means have reached each position.

18. An apparatus as claimed in claim 17 including
said aspirated position sensing means include actuation means carried by said syringe plunger means actuated by contact with said plunger stop for indicating when said plunger means are in said fully aspirated position; and
said dispensed position sensing means include actuation means actuated by said syringe plunger means reaching said dispensed position.

19. An apparatus as claimed in claim 18 including:
said aspirated position actuation means include a reciprocable button and a switch which is actuated by said button being displaced by contact with said plunger stop; and
said dispensed position actuation means include a switch which is actuated by tab means carried by said plunger means.

* * * * *